United States Patent [19]

Zucker

[11] Patent Number: 4,778,730
[45] Date of Patent: Oct. 18, 1988

[54] METHOD OF APPLYING NON-SLIP COATING TO TOOLS AND RESULTING PRODUCT

[75] Inventor: Jerry Zucker, Charleston, S.C.

[73] Assignee: RemGrit Corporation, Bridgeport, Conn.

[21] Appl. No.: 95,045

[22] Filed: Sep. 9, 1987

[51] Int. Cl.⁴ ............................................... B22F 3/00
[52] U.S. Cl. ..................................... 428/552; 81/900; 106/36; 419/9; 419/10; 428/908.8
[58] Field of Search ............................ 81/900; 106/36; 428/908.8, 552; 419/9, 10

[56] References Cited

U.S. PATENT DOCUMENTS

| | | | |
|---|---|---|---|
| 3,133,568 | 5/1964 | Reed | 81/900 |
| 3,616,827 | 11/1971 | Stillwagon | 81/900 |
| 3,656,522 | 4/1972 | Ingimarsson | 81/900 |

FOREIGN PATENT DOCUMENTS

| | | | |
|---|---|---|---|
| 2018179 | 10/1979 | United Kingdom | 81/900 |
| 2063743 | 10/1987 | United Kingdom | 81/900 |

Primary Examiner—Stephen J. Lechert, Jr.
Attorney, Agent, or Firm—Juettner Pyle Lloyd & Verbeck

[57] ABSTRACT

The working surface of a tool such as the tip of a screwdriver is provided with a non-slip coating by means of hard abrasive particles which are bonded to the tool with a brazing alloy.

13 Claims, 1 Drawing Sheet

METHOD OF APPLYING NON-SLIP COATING TO TOOLS AND RESULTING PRODUCT

BACKGROUND OF THE INVENTION

This invention relates to the preparation of a tool wherein the work engaging surfaces of the tool have an abrasive or non-slip solid coating applied thereto. The invention is particularly suitable for use on tools which engage or grip a surface of an object, such tools including, for example, screwdrivers, wrenches, sockets, pliers, clamps and the like. Thus, the applicable range of tools include those used for turning fasteners such as screws, nuts and bolts, as well as providing a gripping or frictional holding force on an object.

In connection with screwdrivers, for example, well known types include the conventional blade screwdriver and the phillips. The bit end of the tool is inserted into a corresponding recess in the screw in a driving connection, and the handle of the screwdriver is turned in order to thread the screw into the work. As the threaded shank of the fastener increases its penetration or engagement with the material or work, the resistance may increase, and the torque required for the operation may also increase. This often causes the screwdriver head to slip or back out of the screw slot, usually causing dmage to the screw and sometimes to the screwdriver. This phenomenon is commonly referred to as "cam out." In order to reduce the severity and frequency of this occurrance, it is necessary to exert additional axial force on the screwdriver to hold it in driving engagement, but a point is eventually reached where slippage will occur. Similar problems with gripping and driving tools are commonplace and need not be described in detail.

There are several proposals in the prior art to provide screwdrivers with non-slip surfaces. The U.S. Pat. No. 3,133,568 to Reed discloses a screwdriver in which the tip has been shot blasted or peened, and scored. The Wickbergh U.S. Pat. No. 1,899,489 discloses a screwdriver having a knurled tip to prevent slippage.

Both of the above patents involve roughening of the metallic working surface of the tool. As the tool is used, however, additional pressure is placed on the raised areas of the roughened surface. As a result, the surface will wear down and lose its effectiveness, and the tool would become undersized or worn out.

Aother type of anti-slip screwdriver is described in U.S. Pat. No. 3,656,522. In this disclosure, an abrasive liquid is contained in the handle of the screwdriver and is fed through the shank to the tip in order to increase friction between the screwdriver tip and the screw recess. The construction of such a tool, however, would be expensive, handling would be difficult, and the tool would leave a residue of abrasive on the fastener.

SUMMARY OF THE INVENTION

In accordance with the present invention, a permanent, abrasive coating is applied or bonded to the working surface of the tool, such as the tip of a screwdriver. The abrasives are particles of a material which is harder than the hardness of the fastener to be encountered. Also, the material used to bind the abrasive to the tool is preferably a hard refractory alloy. In this manner, the working surface of the tool will have a prolonged working life without premature loss of the abrasive surface. During use, the abrasive particles will grip the work surface without excessive wear on the particles or the coating.

Since the tools are subject to industry or government standards as to dimensions and tolerances, the tool employed in the process will initially have less than standard dimensions. Thereafter, a solid coating containing abrasive particles is applied or brazed to the tool at a thickness sufficient to substantially match the standard dimension.

The binder for the abrasive particles is preferably a metal or alloy, and the abrasive may be diamond-substitute particles. The size and profile of the particles and relative thickness of the coating are selected to prevent undue cutting into the work while providing good support for the particles and while greatly increasing the friction with the work. In this manner, the amount of axial force required to use the tool is lessened, and the possibility of slippage is greatly reduced.

While various bonding methods are available, the preferred method is to bond the abrasive particles to the tool with a brazing alloy. The brazing alloy, together with the particles, are applied to the tool and heated to the brazing temperature. This results in a durable wear resistant abrasive coated surface which will have a long life with normal usage of the tool.

THE DRAWING

DESCRIPTION OF THE PREFERRED EMBODIMENT

Figure 1:
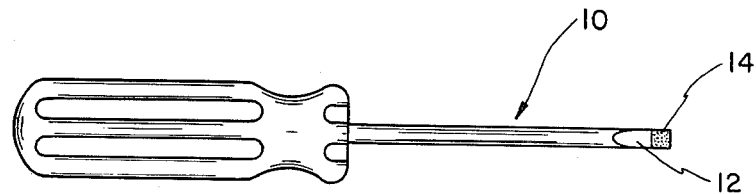
FIG. 1 is a side view of a conventional screwdriver having an abrasive coating at the tip, in accordance with the present invention.

The principles present invention will be described in connection with the particular tools shown in the drawings, but it will be understood that the invention is applicable to any tool or accessory for which the non-slip feature is desired. The tools employed may be of conventional design and specifications, with the exceptions noted herein. Most tools will have working surfaces composed of steel. If the surfaces are normally heat treated, the tool will preferably be obtained in a non-treated condition, since heat treating may be accomplished after application of the abrasive coating. Preferably, the tool is composed of heat treatable alloy steel to provide the necessary strength properties.

In addition, in the case of tools such as screwdrivers, wrenches and sockets, the final dimensions must be within a critical tolerance range, and an allowance must be made for the thickness of the abrasive coating to be applied. Thus, for a blade screwdriver, it is necessary to employ a blade having a smaller than standard dimension. For a wrench or socket, a larger than standard dimension is required.

In accordance with the present invention, a mixture of bonding agent and abrasive particles are uniformly deposited on to the working surface of the alloy steel tool, and the surface and applied abrasive layer are heated to melt the bonding agent and to permanently bond the abrasive particles to the tool surface. In the preferred embodiment, the abrasive particles are diamonds or a diamond substitute, the bonding material is a metal or metallic alloy, and the abrasive particles are brazed to the surface of the tool.

The brazing alloy may be composed of soft metals such as copper or alloys containing more than 50% copper with the remainder as zinc, tin, silver, nickel, cobalt or chromium. Preferably, however, harder and more wear resistant brazing alloys are employed. Generally, these alloys will have a melting point lower than the steel substrate or in the order of from about 1,500° F. to 2,400° F. The brazing alloy preferably contains at least 40% nickel or cobalt with the remainder as chromium, boron, iron, tungsten and silicon and are referred to herein as hard refractory metal alloys. One suitable alloy is referred to as "Stellite" and contains 5-15% chromium, 1-3.5% boron, and 2-5% iron with or without silicon in the amount of 5-10%, with the remainder as nickel. Another suitable alloy is LM Nicrobraz, which contains about 13.5% Cr, 3.5% B, 4.5% Si, 2.5% Fe and the balance nickel. Additional alloys are described in U.S. Pat. Nos. 3,023,490 and 3,024,128.

The abrasive particles are preferably diamond substitutes such as refractory metal carbides, metal borides, metal nitrides or metal silicides. Particularly suitable abrasive particles are composed of tungsten carbide. Industrial diamonds may be employed but are more costly.

In order to apply the abrasive coating, a mixture of the brazing alloy, abrasive particles and usually a flux is applied as a uniform coating to the working surfaces of the tool. The tool and coating are then heated to a temperature sufficient to melt the brazing alloy, and the coated tool is then cooled. This bonds the abrasive particles to the tool, with the particles projecting from the brazing alloy to provide a non-slip surface. Upon cooling, the tool may be subsequently heat treated in accordance with conventional practices. Preferably, however, the alloy steel is of the type in which tempering takes place after coating.

The total coating thickness, the proportion of brazing alloy employed, and the mesh size of the abrasive particles are very important to a successful product. Generally, the coating should be as thin as possible. Thick coatings require a corresponding thickness of metal to be removed from the tool prior to application of the coating, and this may weaken the tool excessively for its intended use. The preferred coating thickness on each surface is preferably in the order of 0.004 to 0.015 inches were tolerances are critical. A thicker coating may be employed on tool surfaces where tolerances are not critical, for example, on adjustable wrenches and pliers.

The thickness of the metallic bonding material relative to the size of the abrasive particles is also important. The particles must project from the bonding material to provide the desired non-slip feature. At the same time, the particles must be adequately supported by the bonding alloy, since the particles will be subjected to considerable twisting and crushing forces. Therefore, the majority of the particles will have at least 35 percent of their volume, and preferably more than 50 percent surrounded by and supported in the bonding alloy.

Finally, the particle size of the abrasive material is also important to achieve the desired properties. If the particles are too large, they will tend to be fragile and to cause excessive damage to the workpiece. Also, coarse particles require thick bonds. Preferably, the particle size is less than 0.012 inches average diameter, and a preferred range is in the order of from about 0.003 to 0.010 inches. A substantially uniform size is also preferred.

Figure 2:
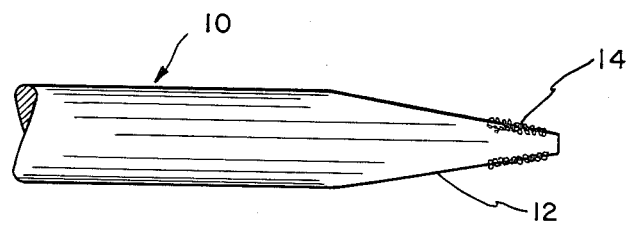
FIG. 2 is an enlarged side view of the tip of a blade screwdriver which has been treated in accordance with the present invention.

In order to carry out the invention, a tool is provided such as the conventional blade screwdriver 10 shown in FIGS. 1 and 2. The blade tip 12 is composed of heat treated alloy steel and has a thickness which is less than the standard thickness in order to accommodate the added thickness of the abrasive coating, as shown in FIG. 2. As shown, the blade includes opposed planar or ground surfaces which taper toward the tip.

The next step is to temporarily bind the abrasive particles and powdered brazing alloy to the opposite faces of the screwdriver blade. In accordance with one method, the carbide particles, powdered brazing alloy, and a suitable flux are mixed together, dried, and ground to provide carbide or abrasive grains which are coated with the alloy and flux mixture. To achieve this result, the brazing alloy is provided in powder form and the particle size is substantially less than the size of the abrasive. Suitable fluxes are well known and include boron-fluoride flux, which is added in an amount equal to about 20 to 40% by weight of the brazing metal.

The working surface of the tool, or tip of the screwdriver, is coated with an organic material which will provide a temporary tacky or adherent surface. Suitable materials include alcohol solutions of shellac and solutions of uncured synthetic resins and organic adhesive. While the surfaces are still tacky, they are passed under a stream of the coated abrasive particle mixture such that a uniform layer is deposited on and adheres to the surfaces. The tip of the tool is then hated to a temperature which is sufficient to liquefy or soften the brazing alloy, which is a temperature below the melting point of the substrate and the abrasive particles. Furnace or induction heating may be used. Typical brazing temperatures are in the order of 1700° to 2200° F.

In another method, the flux and brazing alloy are mixed with water to form a slurry or mud. A coating of this mixture is applied to the working surface of the tool, which is rendered tacky. The abrasive particles are then sprinkled onto the tacky surface, and sufficient particles adhere to provide a uniform coating. The coating region is dried to remove water prior to brazing.

It is desirable to provide an abrasive coating having as uniform a thickness as possible. To accomplish this result, the particle sizes of the abrasive grains are as uniform as possible and are preferably applied in a single layer to the majority of the surface area.

Upon heating and subsequent cooling, the brazing alloy forms a metallurgical bond between the abrasive particles and the steel substrate or working surface of the tool.

Figure 3A:
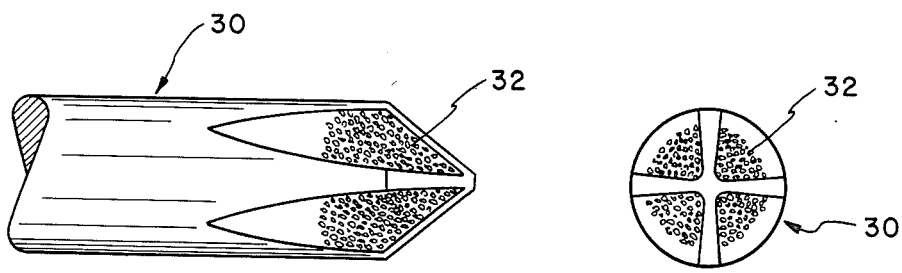
FIGS. 3a and 3b are enlarged side and end views of the tip of a phillips screwdriver having an abrasive coating on the surfaces thereof.
Figure 3B:
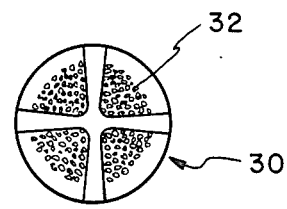

FIGS. 3a and 3b illustrates a conventional phillips screwdriver 30 having an abrasive coating 32 applied on the tip, in the same manner as set forth in connection with FIGS. 1 and 2.

Figure 4:
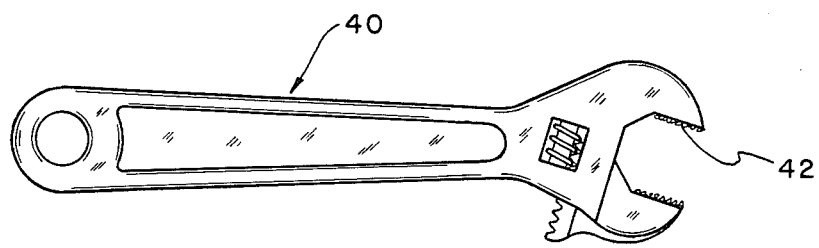
FIG. 4 is a side view of an adjustable wrench which has an abrasive coating applied on the working surfaces.

FIG. 4 illustrates an adjustable wrench 40 in which abrasive coatings are applied to the jaw surfaces 42. In connection with adjustable tools, such as certain wrenches, vice grips, clamps and pliers, the thickness of the abrasive coating is not critical.

What is claimed is:
1. A tool having an antislip surface on a working element thereof, said antislip surface comprising a coating of diamond-like grit particles having a particle size of from about 0.003 to about 0.010 inches, and a metallic brazing material bonding said grit particles to said ele- ment, said element having a reduced dimension for accommodating the thickness of said coating it the order of from about 0.004 to about 0.015 inches, with more than 35 percent of the volume of said particles being surrounded and supported by said metallic brazing material.

2. A tool having an antislip surface on a working element thereof, said antislip surface comprising a coating of diamond-like grit particles having a particle size of from about 0.003 to about 0.010 inches, and a high temperature metallic brazing alloy containing more than 40% cobalt or nickel bonding said grit particles to said element, with more than 35% of the volume of said particles being surrounded and supported by said metallic brazing alloy.

3. The non-slip tool of claim 2 wherein said abrasive particles are metal carbide particles.

4. The non-slip tool of claim 3 wherein said particles are tungsten carbide.

5. The non-slip tool of claim 2 wherein the average size of the particles is less then 0.012 inches in diameter.

6. The non-slip tool of claim 2 wherein the abrasive particles are present on said working element in substantially a single layer.

7. The non-slip tool of claim 15 wherein said tool is a screwdriver.

8. The non-slip tool of claim 2 wherein said tool is a screwdriver having a tip of less than standard dimensions, and said metallurgical bond and abrasive particles are applied to said tip and are sufficiently thick to render said tip substantially equal to standard dimensions.

9. The non-slip tool of claim 2 wherein said tool comprises a wrench, and said working element comprises opposed jaws, said abrasive particles being applied to the surfaces of said jaws.

10. Method of applying a non-slip coating to the working surfaces of a screwdriver comprising the steps of providing an alloy steel screwdriver with a tip having dimensions less than standard dimensions, adhering a layer of a mixture of abrasive particles and particles of a brazing alloy to said tip, the thickness of said layer being sufficient to provide dimensions on said tip substantially equal to standard dimensions, the size of said abrasive particles being in the order of 0.003 to 0.010 inches, and heating the applied layer at a temperature sufficient to cause bonding of said brazing alloy between said tip and said abrasive particles projecting from said fused brazing alloy.

11. The tool of claim 1 wherein the diamond-like grit particles are comprised of tungsten carbide.

12. The tool of claim 1 wherein the metallic brazing alloy contains more than 40% cobalt or nickel.

13. The tool of claim 1 wherein the working element of said tool comprises opposed gripping surfaces.

* * * * *